United States Patent
Kitamura

(10) Patent No.: US 8,202,634 B2
(45) Date of Patent: *Jun. 19, 2012

(54) METHOD OF FORMING METALLIC TONE GLITTER PAINT FILMS AND THE PAINTED OBJECTS

(75) Inventor: Toshiya Kitamura, Yokohama (JP)

(73) Assignee: BASF Coatings Japan Ltd. (JP)

( * ) Notice: Subject to any disclaimer, the term of this patent is extended or adjusted under 35 U.S.C. 154(b) by 792 days.

This patent is subject to a terminal disclaimer.

(21) Appl. No.: 11/719,142

(22) PCT Filed: Nov. 24, 2005

(86) PCT No.: PCT/IB2005/003538
§ 371 (c)(1),
(2), (4) Date: May 11, 2007

(87) PCT Pub. No.: WO2006/056866
PCT Pub. Date: Jun. 1, 2006

(65) Prior Publication Data
US 2009/0075100 A1  Mar. 19, 2009

(30) Foreign Application Priority Data
Nov. 26, 2004 (JP) ................ 2004-342433

(51) Int. Cl.
*B32B 27/00* (2006.01)
*B05D 5/00* (2006.01)
*B05D 1/36* (2006.01)
*B05D 3/02* (2006.01)
*B05D 7/16* (2006.01)

(52) U.S. Cl. .......... 428/699; 427/419.2; 427/419.3; 427/372.2

(58) Field of Classification Search ........ 427/372.2, 427/383.1, 407.1, 409, 419.1–419.3, 384, 427/385.5, 388.1; 428/701, 689, 699, 457; 523/160, 161; 106/404, 31.6, 31.9
See application file for complete search history.

(56) References Cited

U.S. PATENT DOCUMENTS 6,331,326 B1 * 12/2001 Tsunoda et al. ............. 427/202
6,579,355 B1 *  6/2003 Schmidt et al. ............. 106/415

FOREIGN PATENT DOCUMENTS

| JP | 2002-273329 | 9/2002 |
|---|---|---|
| JP | 2003-73621 | 3/2003 |
| JP | 2003-88801 | 3/2003 |
| JP | 2003-213214 | 7/2003 |
| JP | 2004-358329 | 12/2004 |
| JP | 2005-200519 | 7/2005 |

OTHER PUBLICATIONS

International Search Report for PCT/IB2005/003538, International Filing Date Nov. 25, 2005.
Written Opinion for PCT/IB2005/003538, International Filing Date Nov. 24, 2005.

* cited by examiner

*Primary Examiner* — William Phillip Fletcher, III
(74) *Attorney, Agent, or Firm* — Cantor Colburn LLP

(57) ABSTRACT

A metallic tone glitter paint film is formed by applying sequentially a first base metallic paint, a second base glitter paint in which there is compounded a very small scale-like pigment, or a very small scale-like pigment and an aluminum pigment (C), and a clear paint, and baking and hardening. The first base metallic paint comprises aluminum pigment (A) or which the average particle diameter $D_{50}$ is from 13 to 40 μm and the average thickness is from 0.4 to 2.5 μm and aluminum pigment (B) of which average particle diameter $D_{50}$ is from 4 to 30 μm and the average thickness is from 0.02 to less than 0.4 μm, and the solid fraction ratio (A/B) of the aluminum pigments (A) and (B) is from 90/10 to 10/90 and the solid fraction mass (A+B) of the aluminum pigments (A) and (B) is from 5 to 50 parts by mass per 100 parts by mass of the resin solid fraction.

18 Claims, No Drawings

METHOD OF FORMING METALLIC TONE GLITTER PAINT FILMS AND THE PAINTED OBJECTS

This application is a National Phase Application of Patent Application PCT/IB2005/003538 filed on 24 Nov. 2005, which claims priority to JP 2004-342433, filed 26 Nov. 2004, both of which hereby incorporated by reference.

FIELD OF THE INVENTION

The invention concerns a method of forcing metallic tone glitter paint films which have excellent base-concealing properties and which impart a sense of solid glitter and a sense of glitter and which have ideal high degrees of both pearlescent gloss and metallic gloss as industrial paints for use, for example, on automobiles, automatic vending machines, domestic electrical goods and other parts.

BACKGROUND TECHNOLOGY

Metallic paints which contain aluminum powder and mica powder have been used in the past as glitter paints with which metallic paint films which have the gloss of a metallic tone are formed. For example, metallic paint films comprising a first metallic paint film which contains aluminum powder which is formed on the surface of the object which is being painted, a second metallic paint film which contains petal-like glass powder which has a metallic glitter at the surface which in formed on said first metallic paint film surface and a clear paint film which is formed on said second metallic paint film surface have been proposed (see Patent Citation 1), but there is a weakness in that a pearlescent gloss is not obtained with the petal-like glass which has a metallic gloss which is used here.
[Patent Citation 1]
  Japanese Unexamined Patent Application Laid Open H2-160079
  Furthermore, metallic paint film structures in which a clear or colored metallic paint film layer which contains from 0.1 to 30 parts by mass of glitter material and a clear or colored metallic paint film which contains from 0.1 to 30 parts by mass of a glitter material which is different in terms of some features among the type, diameter and amount included from the glitter material used in the metallic paint film form a laminate with at least two layers on the surface of a painted obi act has bean proposed, (see Patent Citation 2
[Patent Citation 2]
  Japanese Unexamined Patent Application Laid Open H3-270768
  However, when the same type of glitter material is used in these metallic paint films there is a problem in that it is difficult to obtain a sense of solid glitter and a sense of glitter with both pearlescent gloss and metallic gloss, and when different glitter materials are used in the metallic paint film layers a solid color which includes glitter material is required as the lowermost layer as well as the two metallic layers in order to obtain a paint film which has a high order of solidity and there is a problem in that it lacks a sense of glitter which has both a pearlescent gloss and a metallic gloss.
  Furthermore, a method of forming a multi-layer paint film with a three-coat-one-bake system in which a colored base coat which contains titanium white pigment and aluminum flakes such that the color tone is from N7 to N9 on the Munsell Color Chart is applied, a base coat of a white pearl tone or a silver pearl tone which contains titanium oxide coated scale-like mica powder is applied and then clear painting is carried out and the films are then heated and hardened has been proposed (see Patent Citation 3). However, the pigment color concealing performance on using titanium oxide is high and there is a problem in that the sense of a metallic tone glitter is lacking.
[Patent Citation 3]
  Japanese Unexamined Patent Application Laid Open H9-164358
  A method of forming multi-layer paint films in which, as a means of obtaining a metallic gloss, a base coat paint (A), a metallic paint (B) and a clear paint (C) are applied sequentially, in which a colored pigment is used in the base coat paint (A) and the clarity (brightness) of the paint is set to an L-value of from 0 to 40, in which aluminum petals of thickness from 0.01 to 0.2 μm and aspect ratio from 100 to 300 are used for the metallic pigment in the metallic paint (B) and in which the resin composition compounding rate per 100 parts by weight of the aluminum petals as solid fraction is not more than 400 parts by weight is known (see Patent Citation 4). However, with this method there is a weakness in that glitter which has both a pearlescent gloss and a metallic gloss is lacking since a metallic paint (B) which has aluminum pigment as the main component has been used.
[Patent Citation 4]
  Japanese Unexamined Patent Application Laid open 2000-084483
  Moreover, glitter paint compositions which contain a vehicle and two or more types of interference glitter pigment of which one is (a) an interference glitter pigment of average particle diameter from 5 to 10 μm and the other is (b) a different type of glitter material from (a) of average particle diameter from 10 to 30 μm have been proposed (see Patent Citation 5). However, it is not possible even with this method to obtain a sense of glitter which has both a pearlescent gloss and a metallic gloss.
[Patent Citation 5]
  Japanese Unexamined Patent Application Laid Open 2003-73621
  Furthermore, a method of forming paint films using small particle diameter scale-like glitter material of average particle diameter act more than 10 μm in a first stage in which a glitter base paint film is formed and large particle size scale-like glitter material of average particle diameter at least 15 μm in a second stage in which a glitter base paint film is formed is known as a method in which the orientation of the large particle glitter material at the paint film surface is even and no deviation arises in the sense of glitter of the paint film which has been formed is known (see Patent Citation 6). However, with this method there is a weakness in that it lacks glitter which has both a pearlescent gloss and a metallic gloss since a metallic paint which has aluminum pigment as the main component has been used.
[Patent Citation 6]
  Japanese Unexamined Patent Application Laid Open 2002-102798

DISCLOSURE OF THE INVENTION

Problems to be Resolved by the Invention

The problem for the present invention is to provide a method of forming paint films which have excellent base concealing properties and with which a sense of solid glitter and a sense of glitter with which nigh degrees of both pearlescent gloss and metallic gloss are combined.

Means of Resolving These Problems

The method for forming a metallic tone glitter paint film of this invention is a method in which a first base metallic paint which contains (A) aluminum pigment of average particle diameter $D_{50}$ from 13 to 40 µm and average thickness from 0.4 to 2.5 µm and (B) aluminum pigment of average particle diameter $D_{50}$ from 4 µm to 30 µm and average thickness from 0.02 to less than 0.4 µm in which the ratio (A/B) of the masses of the solid fractions of the aluminum pigments (A) and (B) is from 90/10 to 10/90 and the total mass (A+B) of the solid fractions of the aluminum pigments (A) and (B) is from 5 to 50 parts by mass per 100 parts by mass of the resin solid fraction, a second base glitter paint in which is compounded a very small scale-like pigment, or a very small scale-like pigment and an aluminum pigment (C), and a clear paint are coated sequentially and baked and hardened.

Furthermore, it is a method of forming a metallic tone glitter paint film in which the abovementioned glitter paint is a glitter paint comprising from 2 to 50 parts by mass of very small scale-like pigment, or very small scale-like pigment and the aluminum pigment (C), per 100 parts by mass of resin solid fraction.

Furthermore, it is a method of forming a metallic tone glitter paint film in which the abovementioned aluminum pigment is of one type, or of two or more types, of aluminum flake pigment, colored aluminum flake pigment, metal oxide coated aluminum flake pigment and vapor deposited aluminum flake pigment.

Moreover, it is a method of forming a metallic tone glitter paint film in which the abovementioned very small scale-like pigment is of one type, or of two or more types, of metal oxide coated mica pigment, metal oxide coated synthetic mica pigment, metal oxide coated alumina flake pigment, metal oxide coated silica flake pigment, metal oxide coated iron oxide, stainless flakes, metallic titanium flake pigment, plate-like molybdenum sulfide, plate-like bismuth chloride, plate-like iron oxide or cholesteric liquid crystal polymer. Moreover there are the painted objects which are furnished with a paint film which has been formed with the abovementioned paints.

Furthermore, it is a method of forming a metallic tone glitter paint film in which, in the abovementioned glitter paint, the proportions of the aluminum pigment (C) and the very small scale-like pigment are from 0:100 to 50:50 parts by mass.

EFFECT OF THE INVENTION

The inventors have discovered that excellent base concealing properties and a solid sense of glitter and a sense of glitter which has high degrees of both pearlescent gloss and metallic gloss can be obtained by forming a metallic paint which contains (A) aluminum pigment of average particle diameter $D_{50}$ from 13 to 40 µm and average thickness from 0.4 to 2.5 µm and (B) aluminum pigment of average particle diameter $D_{50}$ from 4 to 30 µm and average thickness from 0.02 to less than 0.4 µm in which the ratio A/B of the masses of the solid fractions of the aluminum pigments is from 90/10 to 10/90 and (A+B) as a solid fraction is from 5 to 50 parts by mass per 100 parts by mass of the resin solid fraction for the first base metallic paint on the base paint film which forms the surface of the object which is being painted, forming a glitter paint film in which very small scale-like pigment, or very small scale-like pigment and aluminum pigment, has been compounded over this and then forming a clear paint film and baking and hardening the paint film, and the invention is based upon this discovery.

EMBODIMENT OF THE INVENTION

The constitution of the invention is described in detail below.

<The Metallic Paint>

The metallic paint which is the first base of this invention is a paint in which two types of aluminum pigment are compounded and it provides a sense of glitter (sparkle) with a metallic tone and excellent base concealing properties.

<The Glitter Paint>

The glitter paint which is the second base of this invention is a paint in which a very small scale-like pigment, or a very small scale-like pigment and aluminum pigment, is compounded and it provides a pearlescent gloss.

Furthermore, by applying the glitter paint film on the metallic film which is the first base there is provided a color tone which has the sense of glitter (sparkle) of a metallic tone and also a pearlescent gloss and depth (a sense of solidity).

The aluminum pigments which can be used in the metallic paint and the glitter paint are aluminum flake pigments, colored aluminum flake pigments, metal oxide covered aluminum flake pigments, vapor deposited aluminum flake pigments and the like.

The characteristics of the particles described in this invention can be obtained using the methods of measurement indicated below. Thus the average particle diameter $D_{50}$ indicates the 50% value of the particle size distribution measured with laser diffraction type particle sire distribution measuring apparatus. The particle average thickness (µm) is the value obtained with the formula [4000/water surface covering area $(cm^2/g)$], and the method of measurement has been described, for example, on page 1243 of the "Aluminum Handbook" (Published by Asakura Shoten for the Japanese Light Metals Association Inc, $9^{th}$ edition, published on Apr. 15, 1972).

The aluminum pigments (A) and (B) are used in the metallic paint.

The aluminum pigment (A) of average particle diameter $D_{50}$ from 13 to 40 µm and average thickness from 0.4 to 2.5 µm can impart a sense of sparkling particles, a sense of glitter and flip-flop properties to the paint film but it is distinguished by having poor concealing properties. Commercial aluminum pigments include Alpaste 56-501, Alpaste TCR-3040 and Alpaste 51-148B produced by the Toko Aluminum Co.

The aluminum pigment (A) has an average particle diameter $D_{50}$ of from 13 to 40 µm and an average thickness of from 0.4 to 2.5 µm. If the average particle diameter $D_{50}$ is more than 40 µm and/or the average thickness is more than 2.5 µm then the appearance is degraded and this is undesirable. The average particle diameter $D_{50}$ is preferably from 13 to 35 µm and most desirably from 13 to 30 µm. Furthermore the average thickness of the pigment particles is preferably from 0.4 to 2.0 µm and most desirably from 0.4 to 1.5 µm.

The aluminum pigment (B) of which the average particle diameter $D_{50}$ is from 4 to 30 µm and the average thickness is from 0.02 but less than 0.4 µm is distinguished by imparting concealing properties to the paint film with no great loss of the sense of sparkling particles, flip-flop properties and sense of glitter. Commercial aluminum pigments (B) include Alpaste 6340NS produced by the Toyo Aluminum Co. and SAP 550N produced by the Showa Aluminum Co.

The aluminum pigment (B) has an average particle diameter $D_{50}$ of from 4 to 30 µm and an average thickness of from 0.01 to 0.4 µm. The concealing properties of the paint film are heightened by setting the average particle diameter $D_{50}$ to less than 30 µm and the sense of sparkling particles can be obtained by setting the average thickness to at least 0.01 µm. The average particle diameter $D_{50}$ of the pigment (B) is preferably from 4 to 26 µm, and most desirably from 4 to 22 µm. Furthermore the average thickness of the pigment (B) is preferably from 0.02 so 0.38 µm, and most desirably from 0.02 µm to 0.35 µm.

The solid fraction mass ratio (A/B) of the aluminum pigment (A) and the aluminum pigment (B) is from 10/90 to 90/10, preferably from 10/90 to 80/20, and most desirably from 10/90 to 70/30. In those cases where (A/B) is smaller than 10/90 the sense of glitter is inadequate and the sense of metallic gloss is lost and it is impossible to obtain a sense of solid glitter and a stable sense of glitter which has a high degree of both pearlescent gloss and metallic gloss. In those oases where (AB) exceeds 90/10 the concealing properties are inadequate and the base is liable to base an effect, and it is impossible to obtain a sense of solid glitter and a stable sense of glitter which has high degrees of both pearlescent gloss and metallic gloss.

Moreover, the total amount of the aluminum pigments (A) and (B) is from 5 to 50 parts by mass, preferably from 5 to 40 parts by mass, and most desirably from 5 to 30 parts by mass, per 100 parts by mass of resin solid fraction. In those cases where the total amount of the aluminum pigments (A) and (B) is less than 5 parts by mass the concealing properties are inadequate and in these cases where it exceeds 50 parts by mass the appearance is downgraded and this is undesirable.

One type, or two or more types, can be used appropriately for each of the abovementioned aluminum pigments (A) and (B).

The abovementioned aluminum pigments are pigments which impart concealing properties and the metallic sense of a metallic tone to the paint film, and they may be leafed, semi-leafed or non-leafed aluminum flakes which have been prepared with the usual methods in which aluminum is subjected to a pulverization treatment together with a fatty acid such as stearic acid in a ball mill. Moreover, colored aluminum flake pigments where an organic colored pigment or an inorganic colored pigment has been coated in the form of petals on the base aluminum flakes can also be used.

Metal oxide coated mica pigments, metal oxide coated synthetic mica pigments, metal oxide coated alumina flake pigments, metal oxide coated silica flake pigments, metal oxide coated plate-like iron oxide, stainless flakes, metallic titanium flake pigments, plate-like molybdenum sulfide, plate-like bismuth chloride, plate-like iron oxide and cholesteric liquid crystal polymers, for example, can be used for the aforementioned very small scale-like pigment, and the particle diameter is from 2 to 70 µm, preferably from 4 to 60 µm and most desirably from 5 to 50 µm and the thickness is from 0.1 to 2.5 µm and preferably from 0.2 to 2.0 µm.

The abovementioned metal oxide coated mica pigments and metal oxide coated synthetic mica pigments, metal oxide coated alumina flake pigments, metal oxide coated silica flake pigments and metal oxide coated plate-like iron oxides are materials where a metal oxide such as $TiO_2$, $Fe_2O_3$, $SnO_2$, $ZrO_2$ and the like has bean coated onto a natural or synthetic mica powder (mica powder), aluminum oxide powder, silica powder or plate-like iron oxide powder respectively.

The Glitter paint contains a very small scale-like pigment or a very small scale-like pigments and an aluminum pigment. Preferably the proportions of the aluminum pigment and the very small scale-like pigment in the glitter paint are from 0:100 to 50:50 parts by mass, preferably from 0:100 to 40:60 parts by mass, and most desirably from 0:100 to 30:70 parts by mass. In those cases where the proportion of the aluminum pigment in the proportions of the aluminum pigment and the very small scale-like pigment exceeds 50 parts by mass, the concealing power of the aluminum pigment is increased and the solid sense is lost and the sense of glitter with a pearlescent gloss is reduced and so this is undesirable.

The total mass of the very small scale-like pigment and the aluminum pigment in the glitter paint is preferably from 2 to 50 parts by mass, more desirably from 3 to 40 parts by mass, and most desirably from 3 to 30 parts by mass, per 100 parts by mass of the resin solid fraction. In those cases where it is less than 2 parts by mass the manifestation of the glitter of the second coat is inadequate and in those cases where it exceeds 50 parts by mass the appearance of the paint film is liable to be adversely affected.

Colored pigments can be used, as required, in the metallic paint and glitter paint to an extent where the excellent base concealing properties and the sense of solid glitter and the sense of glitter which has high degrees of both pearlescent gloss and metallic gloss which are characteristics of the invention are not lost. Examples of the pigments which can be used include the azo-lake based pigments, phthalocyanine-based pigments, indigo-based pigments, perylene-based pigments, quinophthalone-based pigments, isoindolinone-based pigments, metal complexes, yellow iron oxide, red iron oxide, titanium dioxide, micro titanium oxide, carbon black and the true pigments.

The added amount of colored pigment used in the metallic paint is preferably from 0 to 100 parts by mass, more desirably from 0 to 50 parts by mass and most desirably from 0 to 30 parts by mass, per 100 parts by mass of aluminum pigment. In those cases where the amount added exceeds 100 parts by mass the concealing power is increased by the colored pigment and the sense of glitter of the metallic tone becomes inadequate.

The added amount of colored pigment used in the glitter paint is preferably from 0 to 50 parts by mass, and most desirably from 0 to 30 parts by mass, per 100 parts by mass of the very small scale-like pigment or the very small scale-like pigment and aluminum pigment. In those cases where the amount added exceeds 50 parts by mass the concealing power is increased by the colored pigment and the sense of glitter with a pearlescent gloss becomes inadequate.

Crosslinkable functional group containing acrylic resins in which acrylic monomers have been copolymerized with other ethylenic unsaturated monomers, polyester resins obtained by heating and condensing polybasic acids and polyhydric alcohols, alkyd resins which have been obtained by modifying polybasic acids and polyhydric alcohols by reacting with modifying agents such as oils and fats and oil and fat fatty acids (soy bean oil, linseed oil, palm oil, stearic acid and the like) or natural resins (rosin and the like), polyurethane resins and the like can be used for the thermoset resin component which is used in the metallic paint and glitter paint, and from among these use of the acrylic resins and polyester resins is especially desirable. Combinations of two or more of these resins can also be used. The crosslinking agent can be selected from among the melamine resins, urea resins, iscoyanate resins, blocked isocyanate resins, amine-based resins, polyamine-based resins and polycarboxylic acid based resins for example, and combinations of two or more of these can also be used. These thermoset resin components and crosslinking agents are mixed together for use and the hardening reaction can be made to proceed either with heating or at normal temperature.

The proportions of resin for film forming purposes and crosslinking agent of the metallic paint and glitter paint are from 90 to 50 parts by mass of the resin used for film forming purposes calculated as solid fraction and from 10 to 50 parts by mass of crosslinking agent, and preferably from 85 to 60 parts by mass of the resin used for film forming purposes and from 15 to 40 parts by mass of crosslinking agent. If there are less than 10 parts by mass of crosslinking agent (if there are more than 90 parts by mass of resin for film forming purposes) then there is inadequate crosslinking in the paint film.

On the ether hand if there are more than 50 parts by mass of crosslinking agent (if there are less than 50 parts by mass of resin for film forming purposes) then the storage stability of the composition is reduced and the hardening rate is also increased and so the appearance of the paint film becomes poor.

In addition to the abovementioned components, settling Inhibitors, hardening catalysts, ultraviolet absorbers, antioxidants, leveling agents, surface controlling agents, anti-run agents, thickeners, antifoaming agents, lubricants, crosslinked polymer particles (microgels) and the like can be added appropriately to the metallic paint and glitter paint with a view to improving the performance of the paints and the paint films.

The paint compositions which are used in the metallic tone glitter paint film forming method of this invention are preferably used in a liquid state where they are dissolved or dispersed in an organic solvent, for example in a hydrocarbon such as toluene or xylene, a ketone such as acetone or methyl ethyl ketone, an ester such as ethyl acetate, cellosolve acetate or butyl cellosolve, or an alcohol.

The method of forming a paint film of this invention involves forming a metallic paint film on the base material, then forming a glitter paint film and then subsequently forming a topcoat layer using a clear paint.

No limitation is imposed upon the abovementioned base material, and examples include metals such as iron, aluminum, copper and alloys of these metals; inorganic materials such as glass, cement and concrete; plastic materials such as polyethylene resins, polypropylene resins, ethylene/vinyl acetate copolymer resins, polyamide resins, acrylic resins, vinylidene chloride resins, polycarbonate resins, polyurethane resins and epoxy resins and various types of FRP; and natural or synthetic materials such as wood and fibrous material (such as paper and cloth for example).

In the method of paint film formation of this invention a clear paint is applied after applying a glitter paint via a metallic paint film to the abovementioned base material. In this case chemical forming treatments, undercoat painting and midcoat painting, for example, may be carried out as required.

In the method of paint film formation of this invention the metallic paint film is formed first of all on the abovementioned base material and then a glitter paint film is formed using glitter paint. With the abovementioned glitter paint composition the glitter paint film does not conceal the underlying layer completely and forms a composite paint film with the metallic paint film which is present as the under-layer and it provides a color tons which has a sense of glitter (sparkle) with a metallic tone whilst having both a pearlescent gloss and depth (solidity).

The glitter paint can be painted on a metallic paint film which is in the hardened state or it can be painted wet-on-wet on a metallic paint film which is in the unhardened state. The method of painting may be a method such as air-spray painting, airless spray painting, electrostatic painting or the like. Furthermore, no particular limitation is imposed upon the painting film thickness of the glitter paint film as the hardened paint film of the glitter paint film but it is generally applied within the range from 5 to 30 μm. Said paint film can be crosslinked and hardened in the range from normal temperature to 160° C. For hardening at from normal temperature to 100° C. the use of a two-liquid urethane paint is preferred, and for hardening at from 100° C. to 160° C. the use of an acrylic/melamine paint of the one-liquid, type, for example, is preferred, but no particular limitation is imposed.

The clear paint is a liquid paint which has been compounded with a known thermoset resin composition. The main components of the paint composition of the clear paint are a thermoset resin fraction, solvent and additives for use in paints, and materials relating to design such as colored pigments, for example, may be compounded therein, as required, within ranges such than the transparency and appearance of the paint film are not lost.

The materials known in the past can be used for the thermoset resin fraction which is used in the clear paint. For example, there are the resin components comprised of base resins selected from among the acrylic resins, polyester resins, alkyd resins, urethane resins, fluorinated resins and the like which have crosslinkable functional groups and crosslinking agents selected from among the melamine resins, urea resins, isocyanate resins, blocked isocyanate resins and the like. Furthermore, there are also those resins where the cross linking reaction involves carboxyl groups (including blocked carboxyl groups) and epoxy groups and those where the crosslinking reaction involves the auto-condensation of silanol groups and the crosslinking reaction of silanol groups and hydroxyl groups.

The clear paint may be coated on a glitter paint film which is in the hardened state or it may be painted wet-on-wet on a glitter paint film which is in the unhardened state. The method of painting may be a method such as air-spray painting, airless spray painting, electrostatic painting or the like. Furthermore, although no particular limitation is imposed, the painting film thickness of the clear paint film as the hardened paint film in general is preferably within the range from 15 to 60 μm. Said paint film can be crosslinked and hardened in the range from normal temperature to 160° C. With hardening at from normal temperature to 100° C. the use of a two-liquid urethane paint is preferred, and for hardening at from 100° C. to 160° C. the use of a one-liquid type acrylic/melamine paint is preferred, but no particular limitation is imposed.

The known groups which enable a crosslinking reaction with a crosslinking agent to take place can be used as the crosslinkable functional groups of the thermoset resin components which can be used in the aforementioned metallic paints, glitter paints and clear paints. Examples include epoxy groups, silanol groups, alkoxysilane groups, hydroxyl groups, blocked carboxyl groups, amino groups, imino groups, isocyanate groups, blocked isocyanate groups, cyclocarbonate groups, vinyl ether groups, vinyl thioether groups, aminomethylol groups, alkylated aminomethylol groups, acetal groups and ketal groups.

The method of applying the aforementioned metallic paint, glitter paint and clear paint and forming a metallic tone glitter paint film on the object which is to be painted may be a three-coat one-bake method in which the three layers are applied sequentially wet-on-wet and then the three layers are hardened at the same time, a three-coat two-bake method in which the metallic paint is hardened and then the clear paint is applied wet-on-wet on the glitter paint and the two layers are then hardened at the same time, and the three-cost three-bake method in which the metallic paint, the glitter paint and the clear paint each are hardened individually. The crosslinking and hardening can be carried out in the range from room temperature to 160° C. In the range from normal temperature to 100° C. the use of two-liquid urethane paints is preferred and from 100° C. to 160° C., for example, the use of one-liquid type acrylic/melamine paints is preferred, hut no particular limitation is imposed.

At least a single layer clear paint film is formed as a topcoat layer on the glitter paint film layer which has been formed in this way. In those cases where a large amount of glitter pigment is present in the abovementioned glitter paint film layer the sense of glitter and sense of solidity of the surface can be improved by applying two or more layers of clear top paint.

Furthermore, these clear paints may be compounded with additives such as colored pigments, true pigments, modifying agents, ultraviolet absorbers, leveling agents, dispersants, antifoaming agents and the like, as required, within ranges where the transparency is not lost.

ILLUSTRATIVE EXAMPLES

The invention is described in more practical terms below by means of examples of production, illustrative examples and comparative examples. In the absence of any indication to the contrary the terms "parts" and "%" signify "parts by mass" and "mass %" respectively. Furthermore, the invention is not limited by these illustrative examples.

Example of Production 1

(Production of a Resin Solution)
Xylene (300 parts) was introduced into a 2 liter capacity flask which was made of glass and furnished with a thermometer, stirrer, reflux condenser and monomer drip feed apparatus and the temperature was raised slowly to the reflux state. While maintaining the state of reflux, a mixed solution of 75 parts of styrene, 140 parts or methyl methacrylate, 149 parts of butyl methacrylate, 50 parts of butyl acrylate, 75 parts of 2-hydroxyethyl methacrylate, 10 parts of acrylic acid and 1 part of Perbutyl Z (t-butyl peroxybenzoate, polymerization initiator, produced by the Nippon Oil and Fat Co.) was added drop-wise from the drip feed apparatus over a period of 3 hours. After the drip feed had been completed the reflux state was maintained for a further 3 hours and then a mixture of 0.5 part of Perbutyl Z and 10 parts of xylene was added drop-wise from the drip feed apparatus. Then the reflux temperature was maintained for 2 hours and the reaction was continued, after which 189.5 parts of butyl acetate were added, the mixture was cooled to room temperature and the acrylic resin solution, ($\alpha$) of involatile fraction 50 wt % was obtained.
(Production of the Metallic Paints (First Base) (a-1) to (a-13) and (a-15) to (a-19))
Aluminum pigment and colored pigment were compounded in the proportions shown in Tables 1, 2, 3, 4 and 5 with 100 parts of the solid fraction of a resin comprising the hydroxyl group containing acrylic resin ($\alpha$) obtained in Example of Production 1 and melamine resin to prepare the metallic paints (first base) (a-1) to (a-13) and (a-15) to (a-19). Moreover, the colored pigments shown in the tables were mill based pigments obtained by sand mill dispersion in the usual way using some of the acrylic resin ($\alpha$) of Example of Production 1.
(Production of the Metallic Paint (First Base) (a-14)
Aluminum pigment and colored pigment were compounded in the proportions shown in Table 4 under a-14 with 100 parts of the solid fraction of a resin comprising the hydroxyl group containing acrylic resin ($\alpha$) obtained in Example of Production 1 sad polyisocyanate resin to prepare a metallic paint (first base).
(Preparation of the Glitter Paints (Second Base) (b-1) to (b-10) and (b-12) to (b-16)
Very small scale-like pigment, aluminum pigment and colored pigment were compounded in the proportions shown in Tables 1, 2, 3, 4 and 5 with 100 parts of the solid fraction of a resin comprising the hydroxyl group containing acrylic resin ($\alpha$) obtained in Example of Production 1 and melamine resin to prepare the glitter paints (b-1) to (b-10) and (b-12) to (b-16). Moreover, the colored pigments shown in the tables were mill based pigments obtained by sand mill dispersion in the usual way using some of the acrylic resin ($\alpha$) of Example of Production 1.
(Preparation of the Glitter Paint (Second Base) (b-11)
Very small scale-like pigment and colored pigment were compounded in the proportions shown in Table 4 (b-11) with 100 parts of the solid fraction of a resin comprising the hydroxyl group containing acrylic resin ($\alpha$) obtained in Example of Production 1 and polyisocyanate resin to prepare a glitter paint.

The notes indicated in the tables are listed below.
Note 1): Aluminum pigment Alpaste TCR-3040(trade name), produced by the Toyo Aluminum Co., residue on heating 80%, average particle diameter $D_{50}$ 17 μm, average thickness 0.8 μm.
Note 2): Aluminum pigment Alpaste 56-501(trade name), produced by the Toyo Aluminum Co., residue on heating 70%, average particle diameter $D_{50}$ 28 μm, average thickness 1.0 μm.
Note 3): Aluminum pigment Alpaste 51-148B (trade name), produced by the Toyo Aluminum Co., residue on heating 65%, average particle diameter $D_{50}$ 37 μm, average thickness 0.62 μm.
Note 4): Aluminum pigment SAP 550N (trade name), produced by the Showa Aluminum Powder Co., residue en heating 66%, average particle diameter $D_{50}$ 21 μm, average thickness 0.24 μm.
Note 5): Aluminum pigment Alpaste 6340NS (trade name), produced by the Toyo Aluminum Co., residue on heating 71%, average particle diameter $D_{50}$ 13 μm, average thickness 0.29 μm.
Note 6): Trade name, titanium oxide, inorganic pigment, produced by the Ishihara Sangyo Co.
Note 7): Trade name, blue colored pigment, organic pigment, produced by the BASF Co.
Note 8): Trade name, red colored pigment, organic pigment, produced by the BASF Co.
Note 9): Trade name, mixed alkylated melamine resin, produced by the Mitsui Scitech Co., involatile fraction 100%.
Note 10): Trade name, polyisocyanate resin, produced by the Sumitomo Bayer Urethane Co., involatile fraction 75%, isocyanate content 16.5%.
Note 11): Metal oxide coated silica flake pigment Glastream T20-01 WNT Biolavandage (trade name), produced by the Merck Co., involatile fraction 100%
Note 12): Metal oxide coated alumina flake pigment Silaric T60-23 WNT Crystal Blue (trade name), produced by the Merck Co., blue color, involatile fraction 100%
Note 13): Metal oxide coated alumina flake pigment Silaric T60-21 WNT Solaris Red (trade name), produced by the Merck Co., red color, involatile fraction 100%
Note 14): Metal oxide coated mica pigment Rutile Iriozin 219 WNT Rutile Lilac Pearl (trade name), produced by the Merck Co., involatile fraction 100%,
Note 15): Metal oxide coated alumina flake pigment Silaric T60-10 WNT Crystal Blue (trade name), produced by the Merck Co., silver color, involatile fraction 100%
(Preparation of Sheets for Appearance Evaluation Purposes)
Hiepico No. 500 Sealer White (trade name, produced by the Nippon Oil and Fat/BASF Coatings Co.) was painted with an air sprayer on tin plated sheet to provide a film thickness after hardening of 30 μm and, after setting for 5 minutes, this was hardened by baking at 140° C. for 20 minutes to prepare a mid-coat painted sheet.

Example 1

The metallic paint (first base) (a-1) shown in Table 1 (100 parts) diluted with thinner comprising 50 parts toluene and 50 parts butyl acetate was painted with an air sprayer onto one abovementioned mid-coat painted sheet to form a metallic paint (first base) paint film. After being left to stand for 2 minutes at 25° C., 100 parts of the glitter paint (second base) (b-1) shown in Table 1 diluted with thinner comprising 50 parts toluene and 50 parts butyl acetate were painted on said metallic paint (first base) paint surface with an air sprayer to form a glitter paint (second base) paint film. After being left to stand for 3 minutes at 25° C. a clear-coat paint (trade name Belcoat No. 6200 Clear, produced by the Nippon Oil and Fat/BASF Coatings Co.) was painted with an air sprayer over said glitter paint (second base). After being left to stand for 5 minutes at 25° C. said multi-layer paint film was baked for 20 minutes at 140° C. and hardened to produce a pained sheet. The film thicknesses after hardening said multi-layer paint film were metallic paint (first base) paint film thickness 10 μm, glitter paint (second base) paint film thickness 10 μm and clear paint film thickness 30 μm.

Examples 2 to 13

The painted sheets of Examples 2 to 13 shown in Tables 1, 2, 3 and 4 were prepared in the same way as in Example 1.

Example 14

The metallic paint (first base (a-14) shown in Table 4 (100 parts) diluted with thinner comprising 50 parts toluene and 50 parts butyl acetate was painted with an air sprayer onto a mid-coat painted sheet prepared beforehand to form a metallic paint (first base) paint film. Said metallic paint (first base) was a two-liquid urethane paint in which Sumidure N-75 (trade name, produced by the Sumitomo Bayer Urethane Co., solid fraction 75%, isocyanate content 16.5%) was used as a urethane hardening agent. After being left to stand for 2 minutes at 25° C. (normal temperature), 100 parts of the glitter paint (second base) (b-11) shown in Table 4 diluted with thinner comprising 50 parts toluene and 50 parts butyl acetate were painted on said metallic paint (first base) painted surface with an air sprayer to form a glitter paint (second base) paint film. Said glitter paint was a two-liquid urethane paint in which Sumidure N-75 (trade name, produced by the Sumitomo Bayer Urethane Co., solid fraction 75%, isocyanate content 16.5%) was used as a urethane hardening agent. After being left to stand for 3 minuses at 25° C. a clear-coat paint (trade name Hiurethane No. 6500 Clear, a two-liquid type polyurethane paint, produced by the Nippon Oil and Fat/BASF Coatings Co.) was painted with an air sprayer over said glitter paint (second base) painted surface. This was left to stand for 3 days at 25° C. The film thicknesses after hardening said multi-layer paint film were metallic paint (first base) paint film thickness 10 μm, glitter paint (second base) paint trim thickness 10 μm and clear paint film thickness 30 μm.

Comparative Examples 1 to 5

The painted sheets of Comparative Examples 1 to 5 shown in Table 5 were prepared in the same way as in Example 1.

The painted sheets of Examples 1 to 14 and Comparative Examples 1 to 5 were evaluated in respect of various properties on the basis of the criteria indicated below,
(Base Concealment)
⊚: The base was completely concealed.
○: The base was concealed with no problem in practical terms.
Δ: The base could be discerned.
X: The base was completely uncovered.
(Metallic (Metal) Sense of the First Base)
⊚: A satisfactory metallic sense.
○: metallic sense presenting no problem in practice.
Δ: A weak metallic sense.
X: No metallic sense.
(Glitter: Sense of Glitter of Second Base)
⊚: A satisfactory sense of glitter.
○: A sense of glitter presenting no problem in practice.
Δ: A weak sense of glitter.
X; No sense of glitter.
(Appearance of the Paint Film)
⊚: No problem.
○: Slight absorption or unevenness but no problem in practice.
Δ: Some absorption or unevenness.
X: Distinct absorption or unevenness.
(Sense of Solid Glitter and Sense of Glitter with Combined Pearlescent Gloss and Metallic Gloss)
⊚: A satisfactory affect was produced.
○: An effect providing no problem in practice was produced.
Δ: The effect was unsatisfactory
X: No effect was produced.

The painted sheets of Examples 1 to 14 and Comparative Examples 1 to 5 were evaluated on the basis of the criteria indicated above and the results are shown in Tables 1 to 5.

TABLE 1

|  |  | Example | | | |
|---|---|---|---|---|---|
|  |  | 1 | 2 | 3 | 4 |
| Metallic Paint First Base | Compound No. | a-1 | a-2 | a-3 | a-4 |
|  | Proportion of Solid Fraction of Aluminum Pigment A | 30 | 45 | 65 | 75 |
|  | Proportion of Solid Fraction of Aluminum Pigment B | 50 | 55 | 35 | 25 |
|  | (A + B) per 100 of Resin Solid Fraction | 10 | 25 | 25 | 35 |
|  | Colored Pigment per (A + B) = 100 | 0 | 0 | 0 | 0 |
|  | Aluminum Pigment A1 (Note 1) | 0.79 | 3.75 | 5.42 | 7.80 |
|  | Aluminum Pigment B1 (Note 4) | 3.88 | 5.66 | 3.59 | 3.20 |
|  | Acrylic Resin Solution (α) | 44.14 | 37.33 | 37.33 | 33.38 |
|  | Simel 212 (Note 9) | 9.45 | 8.00 | 8.00 | 7.13 |
|  | Xylene | 10.00 | 10.00 | 10.00 | 10.00 |
|  | Butyl Acetate | 31.73 | 35.28 | 35.66 | 38.99 |
|  | TOTAL | 100.00 | 100.00 | 100.00 | 100.00 |
| Glitter Paint | Compound No. | b-1 | b-2 | b-3 | b-4 |
|  | Very Small Scale-like Pigment % | 100 | 100 | 95 | 82 |

TABLE 1-continued

| | | Example | | | |
|---|---|---|---|---|---|
| | | 1 | 2 | 3 | 4 |
| Second Base | Aluminum Pigment % | 0 | 0 | 5 | 18 |
| | Colored Pigment per 100 of Glitter pigment | 0 | 10 | 0 | 0 |
| | Glitter Pigment per 100 of Resin Solid Fraction | 5 | 20 | 28 | 10 |
| | Very Small Scale-like Pigment 1 (Note 11) | 2.72 | | | |
| | Very Small Scale-like Pigment 2 (Note 12) | | 4.10 | | |
| | Very Small Scale-like Pigment 3 (Note 13) | | | 4.15 | |
| | Very Small Scale-like Pigment 4 (Note 14) | | | | 2.98 |
| | Alpaste TCR03040 (Note 3) | | | 0.28 | 0.83 |
| | Tibase CR90 (Note 6) | | 0.05 | | |
| | Heliogen Blue D6700F (Note 7) | | 0.35 | | |
| | Acrylic Resin Solution (α) | 72.45 | 32.79 | 35.00 | 58.18 |
| | Simel 212 (Note 9) | 9.06 | 4.10 | 3.13 | 7.27 |
| | Xylene | 10.00 | 10.00 | 10.00 | 10.00 |
| | Butyl Acetate | 5.77 | 48.82 | 57.44 | 20.73 |
| | TOTAL | 100.00 | 100.00 | 100.00 | 100.00 |
| Third Coat | Belcoat No. 6200 Clear Miurethane No. 6500 Clear | Used | Used | Used | Used |
| Paint Film Thicknesses | Metallic First Base Paint Film | 10 | 10 | 10 | 10 |
| | Glitter Second Base Paint Film | 10 | 8 | 8 | 8 |
| | Clear Coat paint film | 30 | 30 | 20 | 20 |
| Visual Observation | Concealment of Base | ◉ | ◉ | ◉ | ○ |
| | First Base | ◉ | ◉ | ◉ | ◉ |
| | Second Base, sense of glitter or glitter film | ◉ | ◉ | ◉ | ◉ |
| | Paint Film Appearance | ◉ | ◉ | ◉ | ◉ |
| | Sense of Solid Glitter and Sense of Glitter with both pearlescent gloss and metallic gloss | ◉ | ◉ | ◉ | ◉ |

TABLE 2

| | | Example | | |
|---|---|---|---|---|
| | | 5 | 6 | 7 |
| Metallic Paint First Base | Compound No. | a-5 | a-6 | a-7 |
| | Proportion of Solid Fraction of Aluminum Pigment A | 55 | 45 | 45 |
| | Proportion of Solid Fraction of Aluminum Pigment B | 15 | 55 | 55 |
| | (A + B) per 100 of Resin Solid Fraction | 45 | 25 | 25 |
| | Colored Pigment per (A + B) = 100 | 0 | 0 | 0 |
| | Aluminum Pigment A 1 (Note 1) | 10.13 | | |
| | Aluminum Pigment A 2 (Note 2) | | 4.23 | |
| | Aluminum Pigment A 3 (Note 3) | | | 4.52 |
| | Aluminum Pigment B 1 (Note 4) | 2.20 | 5.64 | 5.84 |
| | Acrylic Resin Solution (α) | 29.65 | 37.33 | 37.33 |
| | Simel 212 (Note 9) | 6.35 | 8.00 | 8.00 |
| | Xylene | 10.00 | 20.00 | 20.00 |
| | Butyl Acetate | 43.67 | 34.74 | 34.42 |
| | TOTAL | 100.00 | 100.00 | 100.00 |
| Glitter Paint Second Base | Compound No. | b-5 | b-6 | b-7 |
| | Very Small Scale-like Pigment % | 65 | 55 | 88 |
| | Aluminum Pigment % | 35 | 45 | 22 |
| | Colored Pigment per 100 of Glitter pigment | 0 | 0 | 0 |
| | Glitter Pigment per 100 of Resin Solid Fraction | 12 | 9 | 35 |
| | Very Small Scale-like Pigment 2 (Note 12) | 1.39 | 0.91 | |
| | Very Small Scale-like Pigment 3 (Note 13) | | | 3.50 |
| | Very Small Scale-like Pigment 5 (Note 15) | | | 3.66 |
| | Alpaste TCR03040 (Note 1) | 0.95 | 0.84 | 0.78 |

TABLE 2-continued

|  |  | Example | | |
|---|---|---|---|---|
|  |  | 5 | 6 | 7 |
|  | Acrylic Resin Solution (α) | 28.57 | 23.36 | 23.70 |
|  | Simel 212 (Note 9) | 3.57 | 3.67 | 2.36 |
|  | Xylene | 10.00 | 20.00 | 20.00 |
|  | Butyl Acetate | 55.52 | 55.12 | 57.39 |
|  | TOTAL | 100.00 | 100.00 | 100.00 |
| Third Coat | Belcoat No. 6200 Clear | Used | Used | Used |
|  | Biurethane No. 6500 Clear |  |  |  |
| Paint Film | Metallic First Base Paint Film | 30 | 20 | 20 |
| Thicknesses | Glitter Second Base Paint Film | 6 | 6 | 9 |
|  | Clear Coat paint film | 30 | 30 | 30 |
| Visual | Concealment of Base | ○ | ◉ | ◉ |
| Observation | First Base | ◉ | ◉ | ◉ |
|  | Second Base, sense of glitter or glitter film | ◉ | ○ | ◉ |
|  | Paint Film Appearance | ○ | ◉ | ○ |
|  | Sense of Solid Glitter and Sense of Glitter with both pearlescent gloss and metallic gloss | ◉ | ○ | ◉ |

TABLE 3

|  |  | Example | | | |
|---|---|---|---|---|---|
|  |  | 8 | 9 | 10 | 11 |
| Metallic Paint First Base | Compound No. | a-8 | a-9 | a-10 | a-11 |
|  | Proportion of Solid Fraction of Aluminum Pigment A | 45 | 45 | 45 | 45 |
|  | Proportion of Solid Fraction of Aluminum Pigment B | 55 | 55 | 55 | 55 |
|  | (A + B) per 100 of Resin Solid Fraction | 25 | 35 | 45 | 25 |
|  | Colored Pigment per (A + B) = 100 | 0 | 0 | 0 | 25 |
|  | Aluminum Pigment A 1 (Note 1) | 3.75 | 4.68 | 5.36 | 3.03 |
|  | Aluminum Pigment B 1 (Note 4) |  | 7.04 | 8.06 | 4.58 |
|  | Aluminum Pigment B 2 (Note 5) | 5.36 |  |  |  |
|  | Tipaka CR90 (Note 8) |  |  |  | 1.35 |
|  | Paliogen Red L3880HD (Note 10) |  | 0.00 | 0.00 |  |
|  | Acrylic Resin Solution (α) | 37.33 | 33.28 | 25.65 | 37.63 |
|  | Simel 212 (Note 9) | 8.00 | 7.13 | 6.35 | 8.08 |
|  | Xylene | 10.00 | 10.00 | 10.00 | 10.00 |
|  | Butyl Acetate | 35.78 | 37.87 | 40.57 | 35.30 |
|  | TOTAL | 100.00 | 100.00 | 100.00 | 100.00 |
| Glitter Paint Second Base | Compound No. | b-8 | b-1 | b-1 | b-8 |
|  | Very Small Scale-like Pigment % | 92 | 100 | 100 | 92 |
|  | Aluminum Pigment % | 5 | 0 | 0 | 8 |
|  | Colored Pigment per 100 of Glitter pigment | 5 | 0 | 0 | 5 |
|  | Glitter Pigment per 100 of Resin Solid Fraction | 45 | 6 | 6 | 45 |
|  | Very Small Scale-like Pigment 1 (Note 11) | 2.00 | 2.72 | 2.72 | 2.00 |
|  | Very Small Scale-like Pigment 4 (Note 14) | 1.00 |  |  | 1.00 |
|  | Very Small Scale-like Pigment 5 (Note 15) | 1.22 |  |  | 1.22 |
|  | Alpaste TCR03040 (Note 1) | 0.46 |  |  | 0.46 |
|  | Tipaka CR90 (Note 6) | 0.02 |  |  | 0.82 |
|  | Paliogen Red L3880HD (Note 8) | 0.22 |  |  | 0.21 |
|  | Acrylic Resin Solution (α) | 16.38 | 72.45 | 72.45 | 16.30 |
|  | Simel 212 (Note 9) | 2.04 | 9.06 | 0.06 | 2.54 |
|  | Xylene | 10.00 | 10.00 | 10.00 | 10.00 |
|  | Butyl Acetate | 66.78 | 5.77 | 5.77 | 46.78 |
|  | TOTAL | 100.00 | 100.00 | 100.00 | 100.00 |
| Third Coat | Belcoat No. 6200 Clear | Used | Used | Used | Used |
|  | Biurethane No. 6500 Clear |  |  |  |  |
| Paint Film Thicknesses | Metallic First Base Paint Film | 5 | 7 | 10 | 10 |
|  | Glitter Second Base Paint Film | 10 | 10 | 10 | 10 |
|  | Clear Coat paint film | 30 | 30 | 30 | 30 |

TABLE 3-continued

|  |  | Example | | | |
|---|---|---|---|---|---|
|  |  | 8 | 9 | 10 | 11 |
| Visual Observation | Concealment of Base | ◎ | ◎ | ◎ | ◎ |
|  | First Base | ◎ | ◎ | ◎ | ◎ |
|  | Second Base, sense of glitter or glitter film | ○ | ◎ | ◎ | ○ |
|  | Paint Film Appearance | ◎ | ○ | ○ | ◎ |
|  | Sense of Solid Glitter and Sense of Glitter with both pearlescent gloss and metallic gloss | ○ | ◎ | ◎ | ○ |

TABLE 4

|  |  | Example | | |
|---|---|---|---|---|
|  |  | 12 | 13 | 14 |
| Metallic Paint First Base | Compound No. | a-12 | A-13 | a-14 |
|  | Proportion of Solid Fraction of Aluminum Pigment A | 45 | 45 | 45 |
|  | Proportion of Solid Fraction of Aluminum Pigment B | 55 | 55 | 55 |
|  | (A + B) per 100 of Resin Solid Fraction | 25 | 25 | 25 |
|  | Colored Pigment per (A + B) = 100 | 35 | 45 | 0 |
|  | Aluminum Pigment A 1 (Note 1) | 3.81 | 2.63 | 3.78 |
|  | Aluminum Pigment B 1 (Note 4) | 4.23 | 3.95 | 5.64 |
|  | Heliogen Blue L6700F (Note 7) | 1.75 |  |  |
|  | Paliogen Red L3880HD (Note 8) |  | 2.10 |  |
|  | Acrylic Resin Solution A | 37.80 | 37.85 | 43.73 |
|  | Simel 212 (Note 9) | 8.20 | 8.12 |  |
|  | Sumidure N-75 (Note 10) |  |  | 6.40 |
|  | Xylene | 10.00 | 10.00 | 10.00 |
|  | Butyl Acetate | 35.33 | 38.32 | 30.48 |
|  | TOTAL | 100.00 | 100.00 | 100.00 |
| Glitter Paint Second Base | Compound No. | b-9 | b-11 | b-11 |
|  | Very Small Scale-like Pigment % | 100 | 100 | 100 |
|  | Aluminum Pigment % | 0 | 0 | 0 |
|  | Colored Pigment per 100 of Glitter pigment | 15 | 32 | 0 |
|  | Glitter Pigment per 100 of Resin Solid Fraction | 25 | 10 | 8 |
|  | Very Small Scale-like Pigment 1 (Note 11) |  |  | 2.72 |
|  | Very Small Scale-like Pigment 2 (Note 12) | 2.00 |  |  |
|  | Very Small Scale-like Pigment 5 (Note 15) | 1.58 | 2.65 |  |
|  | Tibaba C899 (Note 6) |  | 0.92 |  |
|  | Heliogen Blue L6700F (Note 7) | 0.58 | 0.02 |  |
|  | Paliogen Red L3880HD (Note 8) |  | 0.82 |  |
|  | Acrylic Resin Solution (α) | 24.85 | 43.40 | 59.37 |
|  | Simel 212 (Note 9) | 3.11 | 5.30 |  |
|  | Sumidure N-75 (Note 10) |  |  | 8.72 |
|  | Xylene | 10.00 | 10.00 | 10.00 |
|  | Butyl Acetate | 57.57 | 38.80 | 19.13 |
|  | TOTAL | 100.00 | 100.00 | 100.00 |
| Third Coat | Belcoat No. 6200 Clear | Used | Used |  |
|  | Biurethane No. 6500 Clear |  |  | Used |
| Paint Film Thicknesses | Metallic First Base Paint Film | 11 | 14 | 20 |
|  | Glitter Second Base Paint Film | 10 | 10 | 10 |
|  | Clear Coat paint film | 30 | 30 | 30 |
| Visual Observation | Concealment of Base | ◎ | ◎ | ◎ |
|  | First Base | ○ | ○ | ◎ |
|  | Second Base, sense of glitter or glitter film | ◎ | ○ | ◎ |
|  | Paint Film Appearance | ◎ | ◎ | ◎ |
|  | Sense of Solid Glitter and Sense of Glitter with both pearlescent gloss and metallic gloss | ○ | ○ | ◎ |

TABLE 5

|  |  | Comparative Example | | | |
|---|---|---|---|---|---|
|  |  | 1 | 2 | 3 | 4 |
| Metallic Paint First Base | Compound No. | a-15 | a-16 | a-17 | a-18 |
|  | Proportion of Solid Fraction of Aluminum Pigment A | 5 | 95 | 45 | 45 |
|  | Proportion of Solid Fraction of Aluminum Pigment B | 95 | 5 | 55 | 55 |
|  | (A + B) per 100 of Resin Solid Fraction | 25 | 25 | 3 | 60 |
|  | Colored Pigment per (A + B) = 100 | 0 | 0 | 0 | 0 |
|  | Aluminum Pigment A 1 (Note 1) | 0.42 | 7.52 | 0.57 | 6.03 |
|  | Aluminum Pigment B 1 (Note 4) | 9.74 | 0.52 | 0.88 | 9.07 |
|  | Acrylic Resin Solution ($\alpha$) | 37.33 | 37.33 | 47.53 | 28.00 |
|  | Simel 212 (Note 9) | 8.00 | 8.00 | 10.15 | 5.38 |
|  | Xylene | 10.00 | 10.00 | 10.00 | 10.00 |
|  | Butyl Acetate | 34.51 | 36.34 | 30.88 | 44.55 |
|  | TOTAL | 100.00 | 100.00 | 100.00 | 100.00 |
| Glitter Paint Second Base | Compound No. | b-12 | b-13 | b-14 | b-15 |
|  | Very Small Scale-like Pigment % | 100 | 93 | 45 | 43 |
|  | Aluminum Pigment % | 0 | 7 | 55 | 57 |
|  | Colored Pigment per 100 of Glitter pigment | 0 | 0 | 0 | 0 |
|  | Glitter Pigment per 100 of Resin Solid Fraction | 1 | 55 | 58 | 15 |
|  | Very Small Scale-like Pigment 1 (Note 11) | 0.48 |  |  |  |
|  | Very Small Scale-like Pigment 2 (Note 12) |  | 3.96 |  |  |
|  | Very Small Scale-like Pigment 3 (Note 13) |  |  | 2.48 |  |
|  | Very Small Scale-like Pigment 4 (Note 14) |  |  |  | 1.96 |
|  | Alpaste TCR03040 (Note 1) |  | 0.37 | 3.83 | 3.39 |
|  | Acrylic Resin Solution ($\alpha$) | 76.04 | 12.39 | 15.39 | 48.70 |
|  | Simel 212 (Note 9) | 9.50 | 1.99 | 1.90 | 6.09 |
|  | Xylene | 10.00 | 10.00 | 10.00 | 10.00 |
|  | Butyl Acetate | 3.88 | 71.73 | 68.60 | 29.36 |
|  | TOTAL | 100.0 | 100.00 | 100.00 | 100.00 |
| Third Coat | Belcoat No. 6200 Clear | Used | Used | Used | Used |
|  | Biurethane No. 6500 Clear |  |  |  |  |
| Paint Film Thicknesses | Metallic First Base Paint Film | 10 | 10 | 10 | 10 |
|  | Glitter Second Base Paint Film | 10 | 8 | 8 | 8 |
|  | Clear Coat paint film | 30 | 30 | 30 | 30 |
| Visual Observation | Concealment of Base | ⊚ | Δ | X | ⊚ |
|  | First Base | Δ | ⊚ | X | ◯ |
|  | Second Base, sense of glitter or glitter film | X | ⊚ | ⊚ | X |
|  | Paint Film Appearance | ⊚ | Δ | Δ | Δ |
|  | Sense of Solid Glitter and Sense of Glitter with both pearlescent gloss and metallic gloss | X | Δ | Δ | X |

As shown by Examples 1 to 5 in Tables 1 and 2, metallic tone glitter paint films which have excellent concealing properties and which have both a pearlescent gloss and a metallic gloss can be obtained by forming a metallic (first base) paint film which contains from 5 to 50 parts by mass of aluminum pigment per 100 parts by mass of resin solid fraction, then forming a glitter (second base) paint film comprising from 2 to 50 parts by mass of very small scale-like pigment, or very small scale-like pigment and aluminum pigment, per 100 parts by mass of resin solid fraction, then forming a clear paint film and then baking and hardening the paint film.

As shown by Examples 6 to 8, similar results can be obtained provided that the aluminum flake pigments are within the prescribed ranges.

As shown in Example 9 and 10, metallic tone glitter paint films which have excellent base concealing properties and both a pearlescent gloss and a metallic gloss can be obtained provided that there are not more than 50 parts of aluminum pigment (A) and aluminum pigment (B) per 100 parts of resin solid fraction. As shown in Examples 11 to 13, metallic tone glitter paint films which have excellent base concealing properties and both a pearlescent gloss and a metallic gloss can be obtained even if a colored pigment is included with respect to the aluminum pigment (A) end aluminum pigment (B).

As shown in Example 14, the prescribed results can be obtained even with a urethane paint.

However, as shown by Comparative Examples 1 and 2 in Table 5, the effect of this patent is not obtained in those cases where the proportions of the aluminum pigment (A) and aluminum pigment (B) in the metallic paint (first base) are outside the scope of the this patent.

Furthermore, as shown, by Comparative Example 3 in Table 5 there is a problem with the concealment of the base with the metallic (first base) paint film and the metallic sense in particular is inadequate when the amounts of aluminum pigment (A) and aluminum pigment (B) compounded are small.

As shown by Comparative Example 4 in Table 5, the prescribed effects are not obtained when the proportions of the aluminum pigment (A) and the aluminum pigment (B) of the metallic paint (first base) are outside the scope of this patent.

As described above, it is possible to obtain a paint film which has excellent base concealing properties and which has a sense of solid glitter and a sense of glitter which has high degrees of both pearlescent gloss and metallic gloss by painting on sequentially a metallic paint in which the proportions by mass of the solid fractions of the aluminum pigments comprising (A) aluminum pigment of average particle diameter $D_{50}$ from 13 to 40 μm and average thickness from 0.4 to 2.5 μm and (B) aluminum pigment of average particle diameter $D_{50}$ from 4 to 30 μm and average thickness from 0.02 to 0.4 μm in the metallic paint of the first base such that (A/B) is from 90/10 to 10/90, and (A+B) as solid fraction is from 5 to 50 parts by mass per 100 parts by mass of resin solid fraction, a glitter paint in which a very small scale-like pigment, or a very small scale-like pigment and an aluminum pigment, have been compounded as a second base, and a clear paint.

The invention claimed is:

1. A method of forming a metallic tone glitter paint film comprising:
    applying a first base metallic paint for providing a sense of glitter with a metallic tone to a base material, the first base metallic paint comprising:
        an aluminum pigment (A) of average particle diameter $D_{50}$ from 13 to 40 μm and average thickness from 0.4 to 2.5 μm; and
        an aluminum pigment (B) of average particle diameter $D_{50}$ from 4 μm to 30 μm and average thickness from 0.02 to less than 0.4 μm,
        wherein the ratio (A/B) of the masses of the solid fractions of the aluminum pigments (A) and (B) is from 90/10 to 10/90, and the total mass (A+B) of the solid fractions of the aluminum pigments (A) and (B) is from 5 to 50 parts by mass per 100 parts by mass of the resin solid fraction;
    applying a second base glitter paint to the first base metallic paint wet-on-wet, wherein the first base metallic paint is in an unhardened state, and the second base glitter paint comprising a very small scale-like pigment, or a very small scale-like pigment and an aluminum pigment (C), wherein the very small scale-like pigment is characterized by providing the metallic tone glitter film with a pearlescent gloss;
    wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations comprising one or more of the foregoing;
    applying a clear paint to the second base glitter paint wet-on-wet, wherein the second base glitter paint is in an unhardened state; and
    baking the first base metallic paint, the second base glitter paint, and the clear paint simultaneously at a temperature ranging from room temperature to 160° C., wherein the resulting metallic tone glitter paint film obtains both a pearlescent gloss and a metallic gloss.

2. The method of claim 1 wherein the mass of solid fraction of the very small scale-like pigment in the glitter paint is from 2 to 50 parts by mass per 100 parts by mass of resin solid fraction.

3. The method of claim 1 wherein at least one of the aluminum pigment (A), the aluminum pigment (B) and the aluminum pigment (C) is selected from the group consisting of aluminum flake pigments, colored aluminum flake pigments, metal oxide coated aluminum flake pigments, vapor deposited aluminum flake pigments, and combinations comprising one or more of the foregoing.

4. The method of claim 1 wherein the ratio of the aluminum pigment (C) and very small scale-like pigment in the glitter paint is from 0:100 to 50:50 parts by mass.

5. A painted object which is furnished with a paint film which has been formed with the method of claim 1.

6. The method of claim 1 wherein the metal oxide is selected from the group consisting of $TiO_2$, $Fe_2O_3$, $SnO_2$, $ZrO_2$, and combinations thereof.

7. A method of forming a metallic tone glitter paint film comprising:
    applying a first base metallic paint for providing a sense of glitter with a metallic tone to a base material, the first base metallic paint comprising:
        an aluminum pigment (A) of average particle diameter $D_{50}$ from 13 to 40 μm and average thickness from 0.4 to 2.5 μm; and
        an aluminum pigment (B) of average particle diameter $D_{50}$ from 4 μm to 30 μm and average thickness from 0.02 to less than 0.4 μm,
        wherein the ratio (A/B) of the masses of the solid fractions of the aluminum pigments (A) and (B) is from 90/10 to 10/90, and the total mass (A+B) of the solid fractions of the aluminum pigments (A) and (B) is from 5 to 50 parts by mass per 100 parts by mass of the resin solid fraction;
    baking the first base metallic paint at a temperature ranging from room temperature to 160° C.;
    applying a second base glitter paint to the first base metallic paint, wherein the first base metallic paint is in a hardened state, and the second base glitter paint comprises a very small scale-like pigment, or a very small scale-like pigment and an aluminum pigment (C), wherein the very small scale-like pigment is characterized by providing the metallic glitter film with a pearlescent gloss;
    wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations thereof;
    applying a clear paint to the second base glitter paint wet-on-wet, wherein the second base glitter paint is in an unhardened state; and
    baking the second base glitter paint, and the clear paint simultaneously at a temperature ranging from room temperature to 160° C., wherein the resulting metallic tone glitter paint film obtains both a pearlescent gloss and a metallic gloss.

8. The method of claim 7 wherein the mass of solid fraction of the very small scale-like pigment in the glitter paint is from 2 to 50 parts by mass per 100 parts by mass of resin solid fraction.

9. The method of claim 7 wherein at least one of the aluminum pigment (A), the aluminum pigment (B) and the aluminum pigment (C) is selected from the group consisting of aluminum flake pigments, colored aluminum flake pigments, metal oxide coated aluminum flake pigments, vapor deposited aluminum flake pigments, and combinations thereof.

10. The method of claim 7 wherein the ratio of the aluminum pigment (C) and very small scale-like pigment in the glitter paint is from 0:100 to 50:50 parts by mass.

11. A painted object which is furnished with a paint film which has been formed with the method of claim 7.

12. The method of claim 7 wherein the metal oxide is selected from the group consisting of $TiO_2$, $Fe_2O_3$, $SnO_2$, $ZrO_2$, and combinations thereof.

13. A method of forming a metallic tone glitter paint film comprising:
  applying a first base metallic paint for providing a sense of glitter with a metallic tone to a base material, the first base metallic paint comprising:
    an aluminum pigment (A) of average particle diameter $D_{50}$ from 13 to 40 μm and average thickness from 0.4 to 2.5 μm; and
    an aluminum pigment (B) of average particle diameter $D_{50}$ from 4 μm to 30 μm and average thickness from 0.02 to less than 0.4 μm,
    wherein the ratio (A/B) of the masses of the solid fractions of the aluminum pigments (A) and (B) is from 90/10 to 10/90, and the total mass (A+B) of the solid fractions of the aluminum pigments (A) and (B) is from 5 to 50 parts by mass per 100 parts by mass of the resin solid fraction;
  baking the first base metallic paint at a temperature ranging from room temperature to 160° C.;
  applying a second base glitter paint to the first base metallic paint, wherein the first base metallic paint is in a hardened state, and the second base glitter paint comprises a very small scale-like pigment, or a very small scale-like pigment and an aluminum pigment (C), wherein the very small scale-like pigment is characterized by providing the metallic glitter film with a pearlescent gloss;
  wherein the very small scale-like pigment is selected from the group consisting of metal oxide coated mica pigments, metal oxide coated synthetic mica pigments, metal oxide coated alumina flake pigments, metal oxide coated silica flake pigments, metal oxide coated iron oxides, stainless flakes, metallic titanium flake pigments, plate-like molybdenum sulfide, plate-like bismuth chloride, plate-like iron oxide, cholesteric liquid crystal polymers, and combinations thereof;
  baking the second base glitter paint at a temperature ranging from room temperature to 160° C.;
  applying a clear paint to the second base glitter paint, wherein the second base glitter paint is in a hardened state; and
  baking the clear paint at a temperature ranging from room temperature to 160° C., wherein the resulting metallic tone glitter paint film obtains both a pearlescent gloss and a metallic gloss.

14. The method of claim 13 wherein the mass of solid fraction of the very small scale-like pigment in the glitter paint is from 2 to 50 parts by mass per 100 parts by mass of resin solid fraction.

15. The method of claim 13 wherein at least one of the aluminum pigment (A), the aluminum pigment (B) and the aluminum pigment (C) is selected from the group consisting of aluminum flake pigments, colored aluminum flake pigments, metal oxide coated aluminum flake pigments, vapor deposited aluminum flake pigments, and combinations thereof.

16. The method of claim 13 wherein the ratio of the aluminum pigment (C) and very small scale-like pigment in the glitter paint is from 0:100 to 50:50 parts by mass.

17. A painted object which is furnished with a paint film which has been formed with the method of claim 13.

18. The method of claim 13 wherein the metal oxide is selected from the group consisting of $TiO_2$, $Fe_2O_3$, $SnO_2$, $ZrO_2$, and combinations thereof.

* * * * *